United States Patent [19]

Mays

[11] E Patent Number: Re. 32,467

[45] Reissued Date of Patent: Aug. 4, 1987

[54] PLOW ATTACHMENT FOR CONVERTING A ROTARY TILLER INTO A PLOW

[76] Inventor: James A. Mays, Drawer H, Booz, Ala. 35957

[21] Appl. No.: 528,267

[22] Filed: Aug. 31, 1983

Related U.S. Patent Documents

Reissue of:

[64] Patent No.: 4,286,671
Issued: Sep. 1, 1981
Appl. No.: 37,884
Filed: May 10, 1979

[51] Int. Cl.[4] ..... A01B 3/58; B62D 51/04

[52] U.S. Cl. ..... 172/253; 172/43; 172/259

[58] Field of Search ..... 172/1, 42, 43, 253, 172/256, 258, 259, 260, 272, 273, 274, 395, 429; 180/19 R, 19 S, 19 H; 280/43

[56] References Cited

U.S. PATENT DOCUMENTS

| | | | |
|---|---|---|---|
| 1,661,237 | 3/1928 | Shaw | 172/395 |
| 2,522,934 | 9/1950 | Engnell et al. | 172/272 X |
| 3,088,525 | 5/1963 | Eastham | 172/259 |
| 3,647,005 | 3/1972 | Boyd | 172/259 |
| 3,978,929 | 9/1976 | Clark | 172/42 |
| 4,189,008 | 2/1980 | Porter | 172/253 |

FOREIGN PATENT DOCUMENTS

| | | | |
|---|---|---|---|
| 1007159 | 2/1952 | France | 172/258 |
| 8655/61 | 10/1959 | Japan | 172/42 |
| 639833 | 7/1950 | United Kingdom | 172/258 |
| 713477 | 8/1954 | United Kingdom | 172/259 |
| 803111 | 10/1958 | United Kingdom | 172/253 |
| 875842 | 8/1961 | United Kingdom | 172/42 |
| 1022548 | 3/1966 | United Kingdom | 172/43 |
| 1455240 | 11/1976 | United Kingdom | 172/43 |

*Primary Examiner*—Richard T. Stouffer
*Attorney, Agent, or Firm*—Robbins & Laramie

[57] ABSTRACT

A rotary tiller plow attachment kit for converting into a plow a rotary tiller of the type having a frame, a pair of handle bars extending rearwardly therefrom, and a horizontal power driven axle on which a pair of cleated pull wheels may be mounted. The kit comprises a plow attachment assembly detachably mountable on the front portion of the rotary tiller frame, and a height adjusting control mounted on one of the handle bars of the rotary tiller for selectively adjusting the height of the plow attachment. Since the height adjusting control is located on the handle bars, the height of the plow attachment assembly may be conveniently adjusted by the user while the pull wheels are in operation.

12 Claims, 6 Drawing Figures

PLOW ATTACHMENT FOR CONVERTING A ROTARY TILLER INTO A PLOW

Matter enclosed in heavy brackets [ ] appears in the original patent but forms no part of this reissue specification; matter printed in italics indicates the additions made by reissue.

BACKGROUND OF THE INVENTION

1. Field of the Invention

The ever rising popularity of home gardening has increased the demand for a simple, effective and economical attachment kit for converting a conventional rotary garden tiller into a light duty plow. The economies associated with such an attachment kit are manifest. For the nominal cost of such a kit, a tiller owner could have both a tilling machine as well as the mechanical equivalent of a garden plow normally costing much more than his tiller.

Such an attachment kit ideally should be readily mountable and dismountable from the frame of the tiller, and should effectively convert a standard rotary tiller into a garden plow which is easily and accurately maneuverable along the closely spaced rows of vegetables frequently characteristic of compact, home cultivation. Such a plow attachment kit should also preferably provide a plow which is height adjustable during use so that the depth of the resulting furrow can be continually controlled.

2. Description of the Prior Art

None of the plow attachment kits of the prior art provide such an easily maneuverable, height adjustable plow. For example, the rotary tiller attachment disclosed in U.S. Pat. No. 3,978,929 extends out from the side of the rotary tiller, thereby encumbering the maneuverability of the resulting device. Additionally, the device disclosed in this patent is not conveniently height adjustable. Likewise, the device disclosed in British patent No. 803,111 in FIG. 4 is not conveniently height adjustable. Moreover, because this device is steered by pivoting the drive wheels, and the plow blades are located behind these drive wheels, this device cannot be steered into the direction desired without first momentarily pivoting the plow blades in a direction opposite to the direction desired, which could result in damage to vegetables when the plow is used adjacent to a row of cultivation. Thus, this plow is not accurately maneuverable. The attachment disclosed in British patent No. 1,022,548 is more maneuverable than either of the two previously discussed devices, but the plow of this device is not conveniently height adjustable while the drive wheels are in operation because the user would have to stop the operation of the device and walk around to the front of it in order to reach the height adjustment. Additionally, the manually controlled double wheeled steering mechanism of this device makes the operation of the plow an unduly complicated task for the users and derogates the maneuverability of the device. Clearly, the prior art does not provide a plow attachment which effectively converts a rotary tiller into an accurately maneuverable garden plow that is conveniently height adjustable while in operation.

SUMMARY OF THE INVENTION

The invention obviates the problems associated with the prior art by providing an attachment kit for converting a conventional rotary garden tiller into an easily maneuverable garden plow which is conveniently height adjustable. Basically, the kit is comprised of (1) a height adjustable plow attachment assembly detachably mountable onto the front portion of the tiller frame, and (2) a plow height control mountable onto the handle bars of the tiller and operatively engaged to the height adjustable plow attachment for selectively and conveniently adjusting the height of the plow on the plow attachment assembly while the device is in use.

The height adjustable plow attachment of the invention includes an elongated plow attachment frame, a frame mounting means mounted on the front portion of the tiller frame for detachably mounting one end of the plow attachment frame to the front of the tiller frame, and a height adjustable suspension assembly including a ground engaging guide wheel attached to the other end of the plow attachment frame. The ground engaging guide wheel of the height adjustable suspension assembly is rotatably mounted on a guide wheel arm pivotally engaged to the end of the plow attachment frame so that the height of the plow frame varies as the guide wheel arm is pivoted. The plow attachment is mounted on the plow attachment frame between the mounting means and the height adjustable suspension assembly.

The height adjustment control is mounted on one of the handle bars of the tiller and includes a crank connected to a leadscrew which is attached to a control cable, which in turn is attached to the top of the pivotally mounted guide wheel arm. Thus, the height of the plow may be conveniently adjusted by the operator by turning the bell crank while the plow is in motion.

BRIEF DESCRIPTION OF THE DRAWINGS

In the drawings, wherein like numerals designate like elements.

DETAILED DESCRIPTION OF THE PREFERRED EMBODIMENT

Figure 1:
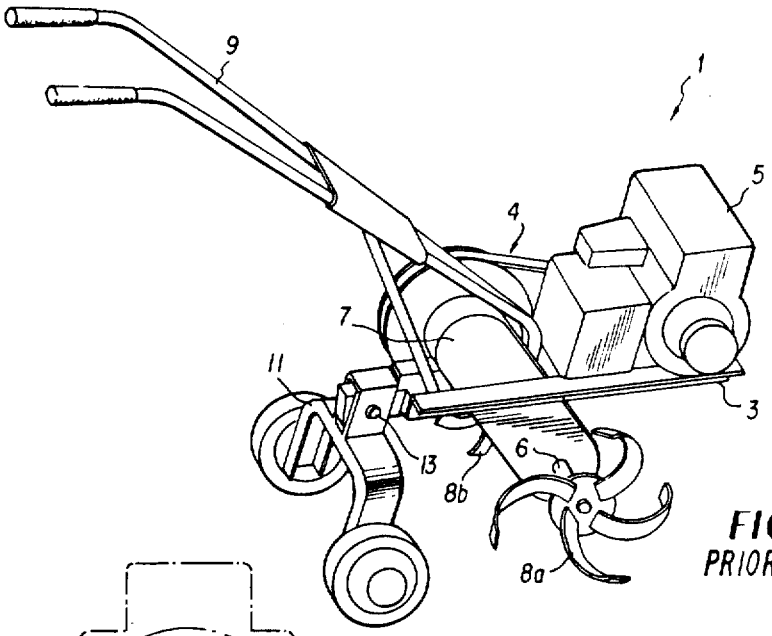
FIG. 1 PRIOR ART
FIG. 1 is a perspective view of a conventional rotary tiller.

FIG. 1 illustrates a conventional rotary tiller 1 generally comprising a frame 3 on which a gasoline engine 5 and a pair of handle bars 9 are mounted. The gasoline engine 5 is mechanically engaged to a drive train 7 by means of belt and pulley arrangement 4 as shown. The drive train 7 in turn gears down the rotational speed of the shaft of the engine 5 and drives horizontally disposed axle 6, on which a pair of tiller tines 8a and 8b are detachably mounted. The tiller frame 3 also has a guide wheel assembly 11 detachably mounted thereon via nut and bolt 13 for stabilizing the tiller 1 during the tilling operation, and for providing a means for conveniently rolling the tiller to a desired location when not in use.

Figure 3:
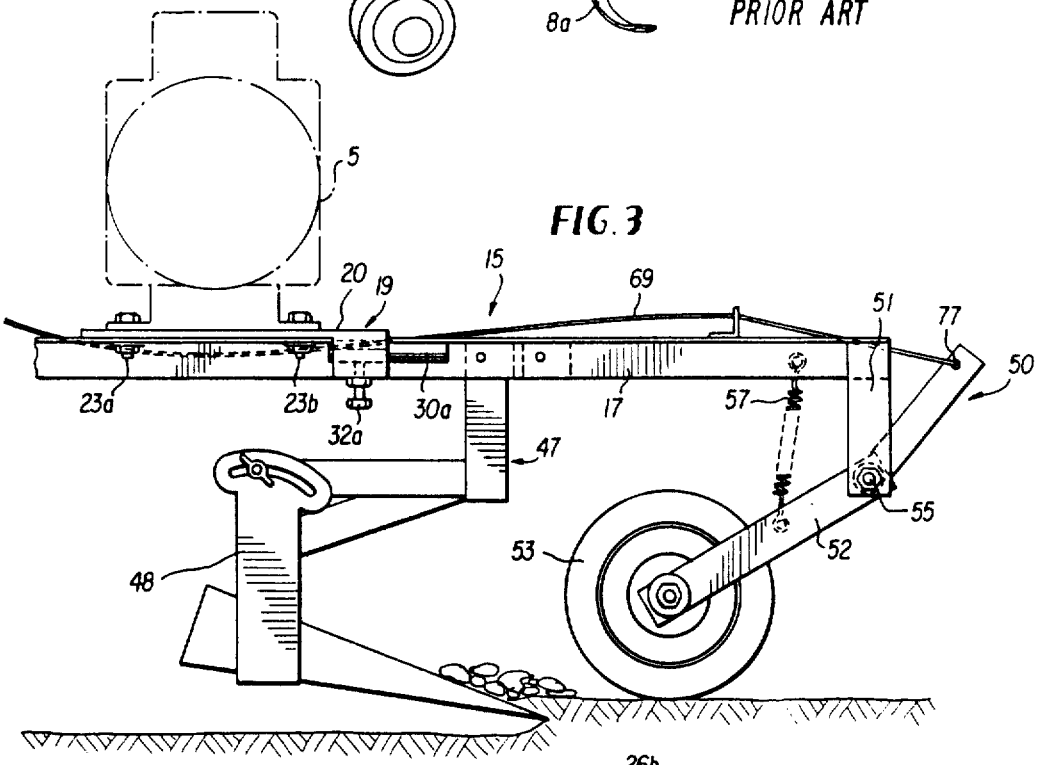
FIG. 3 is a side view of the plow attachment assembly of the invention.
Figure 2:
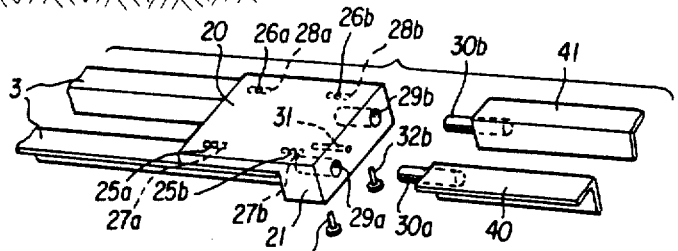
FIG. 2 is a perspective view of the mounting means for mounting the plow attachment assembly of the invention onto the frame of a tiller.
Figure 4:
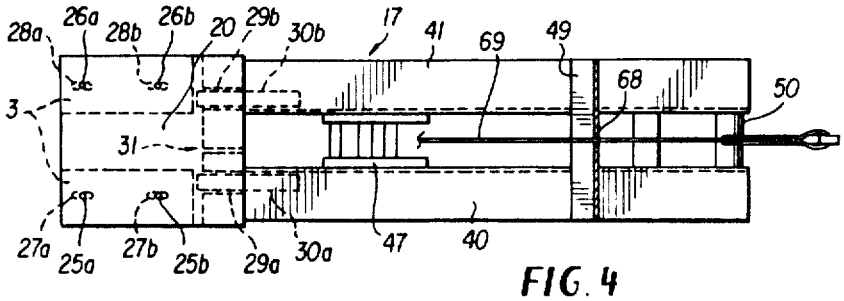
FIG. 4 is a top plan view of the plow attachment assembly of the invention.

FIGS. 2, 3 and 4 generally illustrate the height adjustable plow attachment assembly 15 of the invention. Assembly 15 comprises an elongated plow frame 17 mounted on the front portion of the tiller frame 3 by a frame mounting means generally indicated at 19.

In the preferred embodiment, frame mounting means 19 includes a mounting plate 20 mounted between the base of the engine 5 and the tiller frame 3. Mounting plate 20 is installed by unbolting the engine mounting bolts 23 a, b and 24 a, b (not shown), removing the engine 5 from tiller frame 3, and placing mounting plate 20 in the position shown in FIG. 2 with mounting bar 21 abutting the end of tiller frame 3 and bolt holes 25 a, b and 26 a, b of mounting plate 20 in registry with the bolt holes 27 a, b and 28 a, b of tiller frame 3. The base of engine 5 is then placed back into its original position, and the engine mounting bolts 23 a, b and 24 a, b (not shown) are bolted back into their original positions, thus installing mounting plate 20 in the position shown in FIG. 3.

Mounting plate 20 detachably mounts elongated plow frame 17 of the plow attachment assembly 15 to the tiller frame 3 by means of two parallel bores 29 a, b present in mounting bore 21, each of which receives and secures one of a cylindrical member 30 a, b which extend out from the end of plow frame 17. As illustrated in FIG. 2, the pair of cylindrical members 30 a, b are inserted into the pair of parallel bores 29 a, b much like the blades of an electrical plug are inserted into a wall outlet, and are detachably secured within these bores by means of set bolts and lock nuts 32 a, b into the position shown in FIG. 3.

Mounting plate 20 also includes a hole 31 through which cable 69 is inserted through, as will be discussed in more detail later.

With reference now to FIG. 4, frame 17 is comprised of a pair of angle irons 40, 41 connected together in parallel relationship by a crossbar 49 which serves both to strengthen the plow frame 17 and to provide a guide 68 for cable 69.

With reference now to both FIGS. 3 and 4, plow frame 17 at its back end includes the two cylindrical members 30 a, b just referred to, each of which is permanently affixed to the back end of one of the two angle irons 40, 41 by a weld joint or the like.

In its middle, plow frame 17 includes a plow attachment bracket 47 which in turn supports a plow foot 48 (not included in kit) to which a plow blade 82 is attached. It should be noted at this juncture that the term "plow" is used only in its most generic sense in this application, and is intended to include any type of earthworking tool, such as a harrow, hoe or rake.

At its front end, plow frame 17 includes a height adjustable suspension assembly 50. Suspension assembly 50 generally comprises a vertically disposed bracket 51 which is welded or otherwise affixed to the end of frame 17, and a guide wheel arm 52 which is pivotally connected to bracket 51 by pivot connection 55. Guide wheel arm 52 includes a ground engaging guide wheel 53 rotatably mounted on the bottom end of arm 52 as shown. A tension spring 57 connects the guide wheel arm 52 to the plow frame 17, and biases guide wheel arm 52 toward frame 17, thereby facilitating the operation of the height adjusting means 60, as will now be described in detail.

Figure 5:
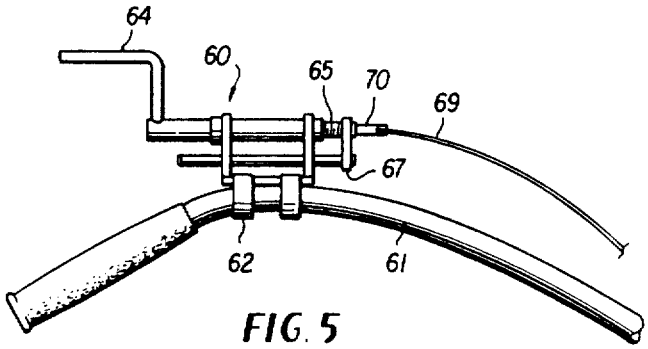
FIG. 5 is a side view of the height adjusting control mounted on one of the handle bars of the rotary tiller.
Figure 6:
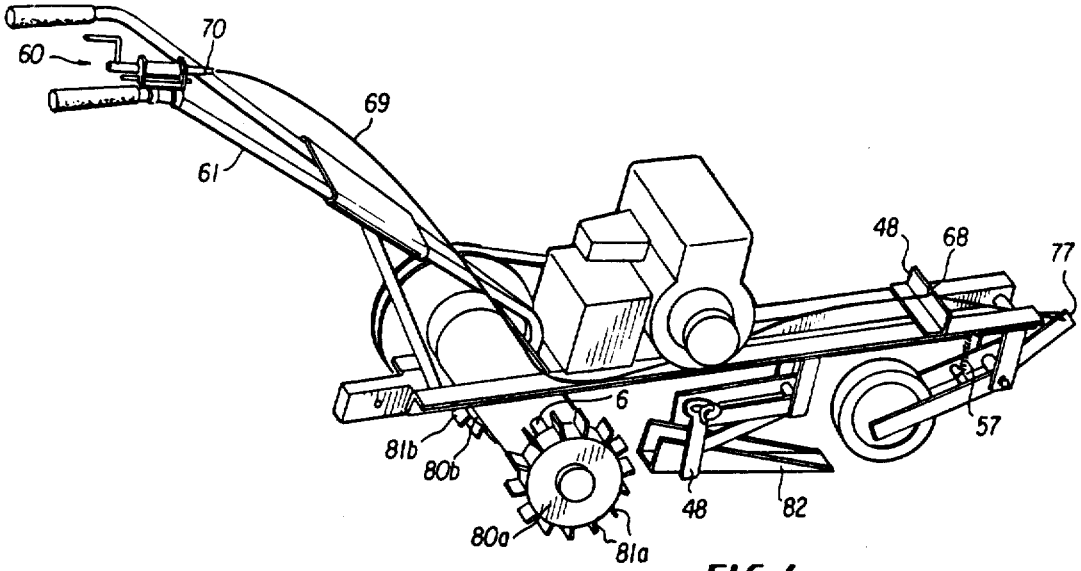
FIG. 6 illustrates the plow attachment assembly kit mounted on the conventional rotary tiller of FIG. 1.

Referring now to FIGS. 5 and 6, height adjustment control 60 is mounted on one of the handle bars 61 of the tiller 1 by means of a worm screw clamp 62. The height adjustment control 60 comprises a crank 64 threadedly engaged to a leadscrew 65 which in turn is connected to a leadscrew guide 67 of a type well known in the art. Leadscrew guide 67 prevents torque generated by crank 64 from being transmitted to cable 69 which is connected to leadscrew 65 via the eye of cable coupling member 70.

Referring now to FIG. 6, which illustrates a rotary tiller which has been converted into a plow by the invention, cable 69 extends from the eye of cable coupling member 70 through guide hole 31 in mounting plate 20 through guide 68 in crossbar 48 of the plow frame assembly 17, where it is finally looped through hole 77 in guide wheel arm 77. Thus, the angle of guide wheel suspension assembly 50 can be adjusted by cranking the crank 64 either clockwise or counterclockwise, thereby withdrawing or extending cable 69. FIG. 6 also illustrates the pull wheels 80a, 80b which have been mounted on the power driven axle 6 of the tiller 1 in place of tiller tines 8a, 8b.

In operation, tiller 1 is converted into the plow illustrated in FIG. 6 by removing tiller tines 8a, 8b and replacing them with pull wheels 80a, 80b which are preferably made from cast iron and include a plurality of cleats 81a, 81b in order to enhance traction. Mounting plate 20 is next semi-permanently mounted onto the frame 3 of the tiller 1 as hereinbefore described. Next, cylindrical members 30 a, b of height adjustable plow attachment assembly 15 are slided into and secured within plate 20 as previously discussed. Height adjustment control 60 is then mounted on one of the handle bars 61 of the tiller 1 by means of worm screw clamp 62. Finally, cable 69 is connected to the eye of cable coupling member 70 of height adjustment control 60 at one end, and to guide wheel arm 52 at the other end.

Thus, a garden plow is provided having a plow blade 82 which may be conveniently raised or lowered by the user when the plow is in operation. To raise the blade 82, the user simply turns the crank 64 in a clockwise direction, thereby withdrawing cable 69 and pivoting the guide wheel assembly 50 toward a more vertical orientation. To lower the blade 82, the user turns the crank 64 in a counterclockwise direction, thereby extending cable 69, so that the spring 57 pivots the guide wheel assembly 50 toward a more horizontal orientation.

To convert the garden plow back into a tiller, mounting plate 20 is left on the tiller frame so that only set bolts 32a, b are needed to either connect or to detach the height adjustable plow attachment assembly 15. Similarly, height adjustment control 60 remains mounted on handle bar 61, and only cable 69 is detached from cable coupling member 70 and guide wheel arm 52. The pull wheels 80a, 80b are of course then replaced with the tiller tines 8a, 8b.

Having described in detail herein the specific structure and operation of my invention, I claim:

1. A rotary tiller plow attachment for converting into a plow a rotary tiller of the type having a frame, at least one handle bar means extending rearwardly therefrom, and a power driven axle for turning a set of tines, comprising:

(a) a pair of pull wheels detachably mountable onto said power driven axle;

(b) a plow attachment assembly detachably mountable onto the front portion of said frame of said rotary tiller, and (c) a height adjusting means for continuously adjusting the height of said plow attachment assembly while said power driven axle turns said pair of pull wheels, including:

(i) a height adjustment control mountable onto one of said handle bar means of said rotary tiller, and (ii) a detachably connectable control cable for connecting said height adjustment control to said plow attachment assembly.

2. The rotary tiller plow attachment of claim 1 wherein said plow attachment assembly is detachably mountable onto the front portion of said frame of said rotary tiller by means including:

(a) at least one elongated element on said plow attachment assembly; and (b) a plate [mounted] *mountable* on said tiller frame having a bore for receiving said elongated element.

3. A rotary tiller plow attachment for converting into a plow a rotary tiller of the type having a frame, a pair of handle bars extending rearwardly therefrom, and a power driven axle for turning a set of tines, comprising:

(a) a pair of pull wheels detachably mountable onto said power driven axle;

(b) a plow attachment assembly;

(c) means for detachably mounting said plow attachment assembly onto the front portion of said tiller frame;

(d) a height adjusting means for continuously adjusting the height of said plow attachment assembly while said power driven axle turns said set of pull wheels including:

(i) a control cable connected to said plow attachment assembly;

(ii) a height adjustment control [mounted] *mountable* onto one of said handle bars of said rotary tiller for continuously extending and retracting said control cable connected to said plow attachment assembly while said power driven axle turns said pair of pull wheels, and (iii) a cable means for detachably connecting said cable to said height adjustment control.

4. The rotary tiller plow attachment of claim 3 wherein said means for detachably mounting said plow attachment assembly includes at least one elongated element on said plow attachment assembly, and a plate [mounted] *mountable* on said tiller frame having a bore for receiving said elongated element.

5. The rotary tiller plow attachment of claim 3 wherein said plow attachment assembly includes a height adjustable suspension assembly, and said control cable is connected to said height adjustable suspension assembly.

6. The rotary tiller plow attachment of claim 5 wherein said height adjustable suspension assembly includes:

(a) a guide wheel arm having:

(i) a first end including means for connecting said control cable thereon, and (ii) a second end including a ground engaging guide wheel;

(b) a pivot connection located on said guide wheel arm between said control cable connection means and said guide wheel, and (c) a biasing means for pivoting said guide wheel arm around said pivot connection when said control cable is extended, whereby said control cable may be extended or retracted to pivot said guide wheel arm about said pivot connection in first and second angular directions, respectively, thereby adjusting the height of said plow attachment.

7. The rotary tiller plow attachment of claim 6 wherein said height adjustment control includes a crank means mountable onto one of said handle bars of said tiller.

8. The rotary tiller plow attachment of claim 7 wherein said crank means includes a leadscrew for extending and retracting said control cable.

*9. An improved plow attachment for converting a rotary tiller into a plow, said rotary tiller having a frame, at least one handle bar means extending rearwardly therefrom, and a power driven axle, said rotary tiller including a set of detachably mounted tines to be driven by said power driven axle, said plow attachment comprising:*

*(a) a pair of pull wheels detachably mountable onto said power driven axle;*

*(b) a plow attachment assembly detachably mountable onto the front portion of said frame of said rotary tiller, said plow attachment assembly including a plow;*

*(c) a height adjusting suspension means located in front of said plow attachment assembly including a ground engaging guide wheel, said height adjusting means operative when actuated for adjusting the height of said plow attachment assembly between a raised and lowered position; and*

*(d) attachment means including at least one elongated element attached to said plow attachment assembly and extending rearwardly thereof, an L-shaped plate mountable to the frame having at least one bore for receiving said elongated element therein, and means for securing the elongated element in the bore for attaching the plow attachment assembly to the front portion of the tiller frame.*

*10. The improved plow attachment of claim 9, wherein said height adjusting suspension means includes an arm and a pivotal connection for pivotally connecting the arm to the front of the plow attachment assembly, and wherein said guide wheel is rotatably connected thereon; and biasing means interconnecting the arm with the plow attachment assembly for pivoting said arm around said pivotal connection.*

*11. The improved plow attachment of claim 10 further including actuating means coupled to the arm and extending rearwardly of the plow attachment assembly for remotely actuating the height adjusting suspension means between raised and lowered positions, said actuating means permitting the biasing means to pivot said arm around said pivotal connection when said plow attachment assembly has been adjusted to said lowered position.*

*12. A rotary tiller plow attachment for converting into a plow a rotary tiller of the type having a frame, a pair of handle bars extending rearwardly therefrom, and a power driven transverse axle for turning a set of tines, comprising:*

*(a) a pair of pull wheels detachably mountable onto said power driven axle;*

*(b) a plow attachment assembly including a plow;*

*(c) means for detachably mounting said plow attachment assembly onto the front portion of said tiller frame including at least one elongated element attached to said plow attachment assembly and extending rearwardly thereof, and an L-shaped plate mountable to the frame having at least one bore for receiving said elongated element therein, and means for securing the elongated element in the bore for attaching the plow attachment assembly to the front portion of the tiller frame; and*

*(d) a height adjusting means mounted on the forward portion of the plow attachment assembly for adjusting the height of said plow attachment assembly between raised and lowered positions.*

* * * * *